(12) United States Patent
Awazu et al.

(10) Patent No.: US 10,128,712 B2
(45) Date of Patent: Nov. 13, 2018

(54) ROTATING ELECTRICAL MACHINE AND METHOD OF MANUFACTURING THE SAME

(71) Applicant: KABUSHIKI KAISHA TOSHIBA, Minato-ku (JP)

(72) Inventors: Minoru Awazu, Yokohama (JP); Isamu Nitta, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 350 days.

(21) Appl. No.: 14/857,319

(22) Filed: Sep. 17, 2015

(65) Prior Publication Data

US 2016/0094101 A1    Mar. 31, 2016

(30) Foreign Application Priority Data

Sep. 30, 2014   (JP) .................................. 2014-200620

(51) Int. Cl.
*H02K 3/28*   (2006.01)
*H02K 21/14*  (2006.01)

(52) U.S. Cl.
CPC ............... *H02K 3/28* (2013.01); *H02K 21/14* (2013.01)

(58) Field of Classification Search
CPC ............ H02K 3/28; H02K 21/14; H02K 3/12; H02K 3/00; H02K 3/50; H02K 1/16
USPC ....... 310/195, 203, 208, 201, 202, 204, 205, 310/206, 207
See application file for complete search history.

(56) References Cited

U.S. PATENT DOCUMENTS

| | | | | |
|---|---|---|---|---|
| 2,989,654 A | * | 6/1961 | Neyhouse ................ | H02K 3/28 310/203 |
| 4,725,751 A | * | 2/1988 | Bassler ................... | G01P 3/465 310/156.46 |
| 4,937,485 A | * | 6/1990 | Mihalko .................. | H02K 3/47 310/12.04 |
| 5,196,751 A | * | 3/1993 | Spirk ....................... | H02K 3/28 310/203 |
| 5,962,945 A | * | 10/1999 | Krenzer ................. | H01F 27/323 174/10 |
| 6,011,339 A | * | 1/2000 | Kawakami ............. | H02K 1/278 310/208 |

(Continued)

FOREIGN PATENT DOCUMENTS

| | | |
|---|---|---|
| CN | 1738151 A | 2/2006 |
| JP | 10-028346 | 1/1998 |

OTHER PUBLICATIONS

Combined Chinese Office Action and Search Report dated Aug. 1, 2017 in Patent Application No. 201510573699.5.

*Primary Examiner* — Forrest M Phillips
(74) *Attorney, Agent, or Firm* — Oblon, McClelland, Maier & Neustadt, L.L.P.

(57) ABSTRACT

A rotating electrical machine includes a stator and a rotor rotatably mounted on the stator. The stator includes a plurality of slots into which coils are insertable, a plurality of types of unit coils inserted into the slots at slot pitches differing for every type of unit coil, and a plurality of coil groups formed by arranging the unit coils in a lap winding so that the unit coils are overlapped in a radial direction of the stator. The coil groups have the same arrangement configuration before insertion into the slots and are inserted into the slots so as to be shifted from each other by a predetermined slot pitch.

20 Claims, 5 Drawing Sheets

(56) References Cited

U.S. PATENT DOCUMENTS

| | | | |
|---|---|---|---|
| 8,174,160 B2* | 5/2012 | Stiesdal | H02K 3/12 |
| | | | 310/184 |
| 8,203,246 B2* | 6/2012 | Nashiki | H02K 3/28 |
| | | | 310/179 |
| 2001/0033116 A1* | 10/2001 | Rose, Sr. | F02N 11/04 |
| | | | 310/180 |
| 2015/0200575 A1* | 7/2015 | Tsuiki | H02K 3/28 |
| | | | 310/203 |
| 2016/0013694 A1* | 1/2016 | Dempster | H02K 3/04 |
| | | | 310/208 |
| 2016/0049841 A1* | 2/2016 | Brennvall | H02K 21/24 |
| | | | 310/208 |

\* cited by examiner

ROTATING ELECTRICAL MACHINE AND METHOD OF MANUFACTURING THE SAME

CROSS-REFERENCE TO RELATED APPLICATIONS

This application is based upon and claims the benefit of priority from the prior Japanese Patent Application No. 2014-200620 filed on Sep. 30, 2014, the entire contents of which are incorporated herein by reference.

FIELD

Embodiments described herein relate to a rotating electrical machine and a method of manufacturing the same.

BACKGROUND

Lap winding is known as a method of winding coils which are inserted into a stator of rotating electrical machine. In the lap winding, a plurality of coils is arranged in a circumferential direction of the stator, and parts of adjacent coils are overlapped in a radial direction of the stator. The coils are wound so that inner coil-sides and outer coil-sides of the overlap are alternately exchanged. Coils forming respective poles of respective phases are arranged so that each coil and an adjacent coil are alternately overlapped in the radial direction of the stator while slots into which the coils are inserted are shifted from each other by a predetermined slot pitch. Since the coils are normally made by winding, for example, a copper wire at a multiple number of times, the coils are poor in flexibility thereby to be low in operability in the case where the coils are inserted into the slots.

Accordingly, for example, a method is proposed in which the coils are divided into a plurality of groups and are inserted into the coils in a stepwise manner.

However, one of the rotating electrical machines includes two, large and small, coils having different slot pitches and forming respective poles in each phase. When a method is employed in which the coils are simply divided and inserted into the slots at a plurality of times, the coils which need to be made have the number obtained by multiplying the number of coils before the division with the number of coils divided. Although the operability is improved in the case of insertion of the coils into the slots, man-hours required to manufacture the coils and man-hours required in the arrangement of the coils before insertion are increased. As a result, the increase in the man-hours becomes a factor that inhibits improvement of productivity.

DETAILED DESCRIPTION

In general, according to one embodiment, a rotating electrical machine includes a stator and a rotor rotatably mounted on the stator. The stator includes a plurality of slots into which coils are insertable, a plurality of types of unit coils inserted into the slots at slot pitches differing for every type of unit coil, and a plurality of coil groups formed by arranging the unit coils in a lap winding so that the unit coils are overlapped in a radial direction of the stator. The coil groups have the same arrangement configuration before insertion into the slots and are inserted into the slots so as to be shifted from each other by a predetermined slot pitch.

According to another embodiment, a method of manufacturing a rotating electrical machine includes making a plurality of types of unit coils inserted into slots at slot pitches differing for every type of the unit coil, making a plurality of coil groups out of the unit coils by a lap winding method, the coil groups being insertable into the slots, and inserting the coil groups into the slots while being shifted from each other by a predetermined slot pitch, after having been overlapped in a radial direction of the stator.

Several embodiments will be described with reference to the drawings. Identical or similar parts are labeled by the same reference symbols throughout the embodiments. In each embodiment, a coil is an annular conductor formed by winding a copper wire at a predetermined number of turns. A unit coil is a minimum unit of coil to be manufactured.

First Embodiment

Construction

Figure 1:
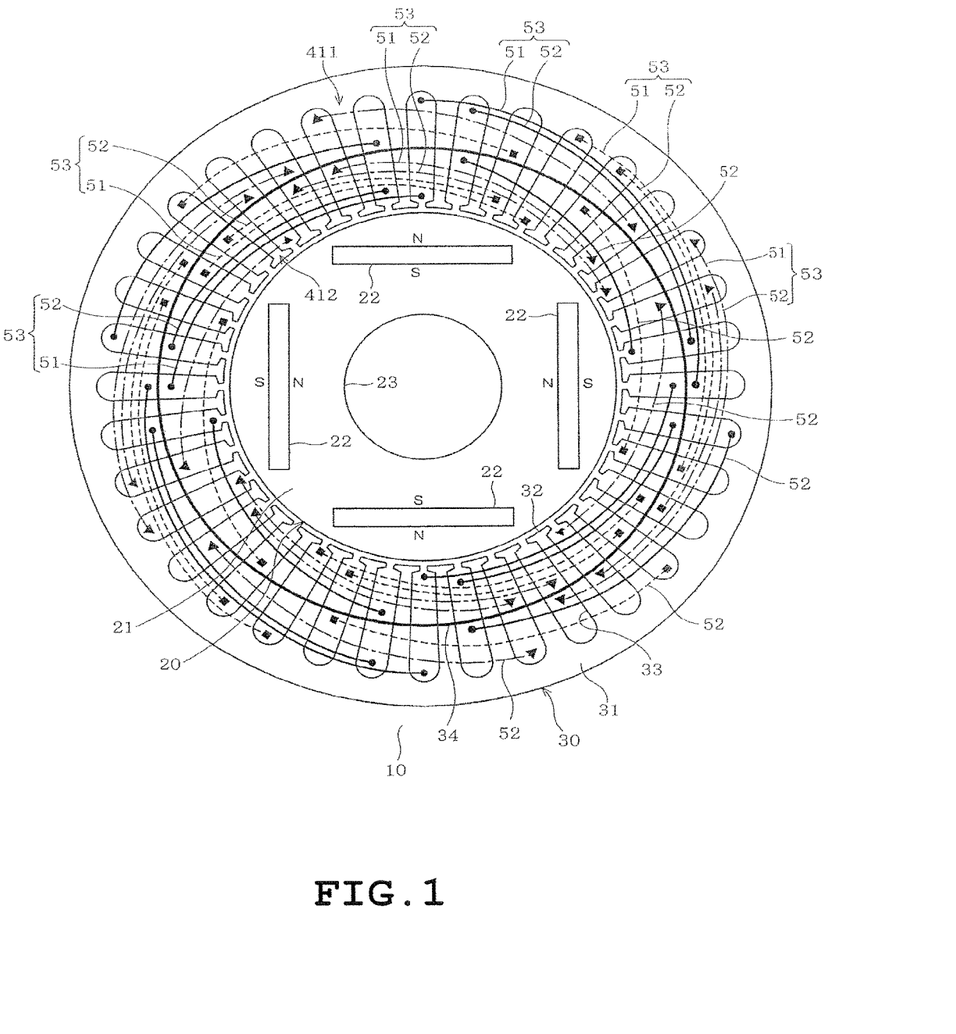
FIG. 1 is a diagrammatic view of a rotating electrical machine according to a first embodiment.
Figure 2:
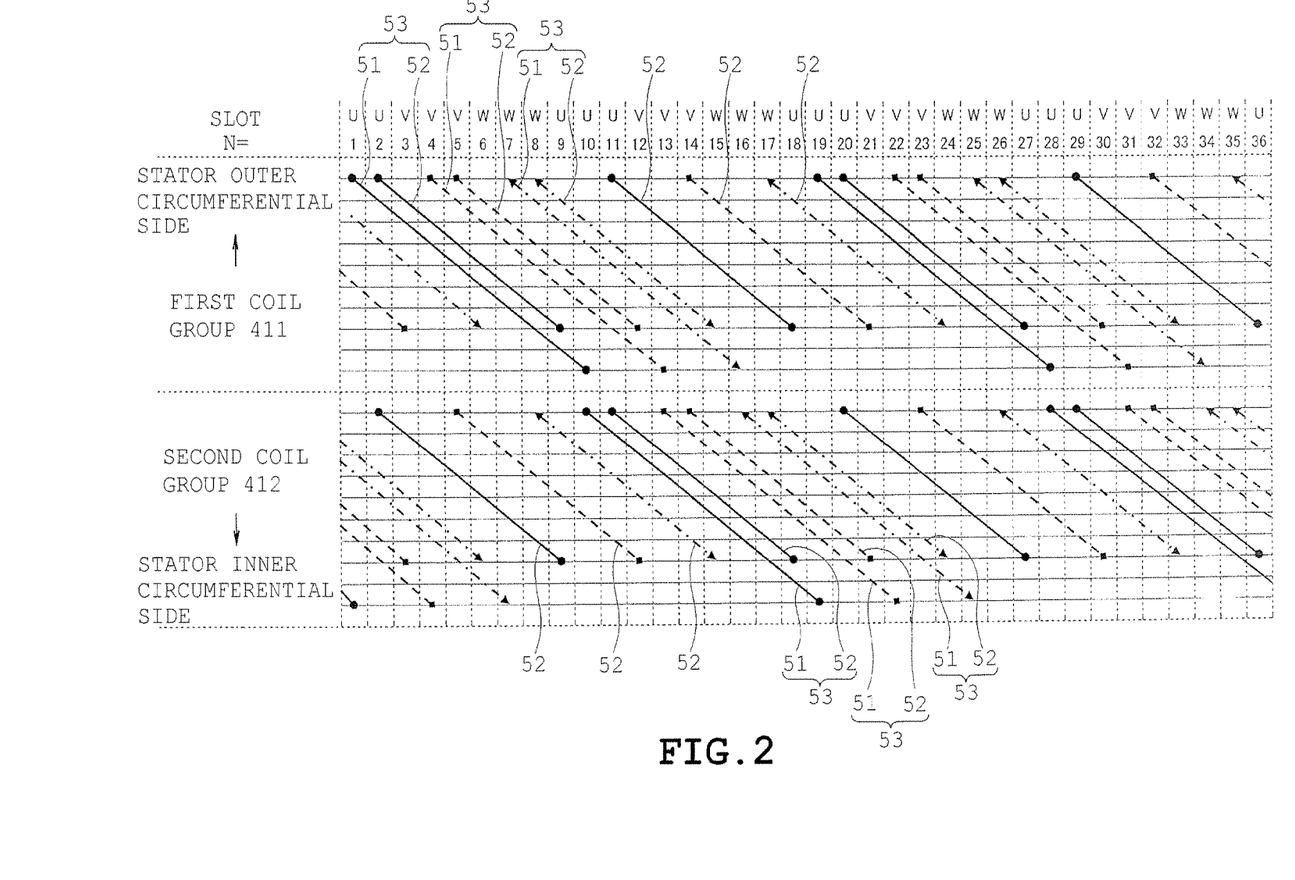
FIG. 2 is a development view showing linearly developed unit coils in first and second coil groups.

A first embodiment will be described with reference to FIGS. 1 and 2. Referring to FIG. 1, a rotating electrical machine 10 is shown as an example and is a three-phase four-pole permanent magnet motor of the inner rotor type in which a rotor is disposed inside a stator. The rotating electrical machine 10 should not be limited to the permanent magnet motor but may be an induction motor. Further, the rotating electrical machine 10 should not be limited to the inner rotor type but may be of the outer rotor type in which a rotor is disposed outside the stator.

The rotating electrical machine 10 includes a rotor 20 and a stator 30. The rotor 20 includes a rotor core 21 and a plurality of, for example, four permanent magnets 22. The rotor 20 is constructed by integrally stacking a plurality of iron core pieces each one of which is formed by punching out a magnetic steel sheet by a press to be formed into an annular shape. The rotor 20 has a centrally formed hole 23 through which a rotating shaft (not shown) is mounted. The permanent magnets 22 are disposed at regular intervals along a circumferential direction of the rotor 20. The permanent magnets 22 are further disposed so that different magnetic poles, that is, the north pole and the south pole are arranged alternately in the circumferential direction of the rotor 20.

The stator 30 includes a stator core 31 which is constructed by integrally stacking a plurality of iron core pieces each one of which is formed by punching out, for example, a magnetic steel sheet by a press to be formed into an annular shape. The stator core 31 has a plurality of, for example, 36 teeth 32 and a plurality of, for example, 36 slots 33 each of which is formed between adjacent teeth 32. The slots 33 are disposed at regular intervals and each formed into a groove shape such that an inner side is open and is recessed radially outward with respect to the stator core 31.

The stator 30 has a first coil group 411 and a second coil group 412. The first and second coil groups 411 and 412 are disposed to overlap each other in a radial direction of the stator 30. In this case, the first coil group 411 is provided radially outside the stator 30, that is, at an outer circumferential side of the stator 30. The second coil group 412 is provided radially inside the stator 30, that is, at an inner circumferential side of the stator 30.

The first and second coil groups 411 and 412 are each constructed of a plurality of types of unit coils, more specifically, first unit coils 51 and second unit coils 52. In this case, each first unit coil 51 and each second unit coil 52 have the same number of turns of a copper wire and differ in an outer diameter of the coil and a slot pitch. The first unit coils 51 are disposed at the slot pitch of nine slots, and the second unit coils 52 are disposed at the slot pitch of seven slots. The slot pitch refers to the number of slots starting from a slot next to a reference slot 33 into which one end of a coil is inserted and ending at a target slot 33 into which the other end of the coil is inserted. For example, when the first unit coils 51 are disposed at the slot pitch of nine slots, one of two ends of each first unit coil 51 is inserted into a reference slot and the other end of each first unit coil 51 is inserted into a ninth or target slot counted from a slot next to the reference slot.

Each unit coil 51 has a larger outer diameter than each second unit coil 52. Accordingly, each first unit coil 51 has a longer overall length than each second unit coil 52. A coil pair 53 is configured of one first unit coil 51 and one second unit coil 52 disposed adjacent to the one first unit coil 51. More specifically, the coil pair 53 is configured of two unit coils having different slot pitches, in this case, the first unit coil 51 and the second unit coil 52. Each first unit coil 51 may be located radially inside or outside the stator core 31 relative to each second unit coil 52.

Each of the first coil group 411 and the second coil group 412 is configured of the coil pairs 53 and the unit coils 52 which do not constitute the coil pairs 53. These coil pairs 53 and unit coils 52 constituting each coil group are inserted into the slots 33 in a lap winding method. In the lap winding method, as shown in FIG. 1, coils are wound so that coils adjacent to each other in a circumferential direction of the stator core 31, in this case, the coil pairs 53 and the second unit coils 52 not constituting the coil pairs 53 are alternately overlapped in the radial direction of the stator core 31, and the inner coil-sides and the outer coil-sides of the overlap are alternately exchanged.

In this case, the second unit coil 52 of one coil pair 53 is disposed in the slot 33 located inside the first unit coil 51. More specifically, the second unit coil 52 is disposed in the slot 33 located at the central part side of the first unit coil 51. Accordingly, the first and second unit coils 51 and 52 forming the coil pairs 53 are wound concentrically. However, the first and second unit coils 51 and 52 forming the coil pairs 53 are wound concentrically, whereby it cannot be denied that the coil pairs 53 and the second unit coils 52 not constituting the coil pairs 53 are arranged on the stator core 31 by the lap winding method.

An end of either unit coil 51 or 52 of each first coil group 411 and an end of either unit coil 51 or 52 of each second coil group 412 are inserted into the slots 33 of the stator 30. Accordingly, the total number of turns of the unit coils 51 and 52 inserted into one slot 33 is twice as large as the number of the unit coil 51 or 52 and equals from one slot to another.

A case where the total number of turns of the unit coils 51 and 52 inserted into one slot 33 equals from one slot to another includes a case where the total number of turns slightly differs from one slot to another as well as a case where the total number of turns completely equals from one slot to another. More specifically, for example, it is considered that the numbers of turns of the coils inserted into one or more slots 33 are changed in order that a rotational position of the stator 30 may be detected. However, even when the total number of turns of the unit coils 51 and 52 inserted into one slot 33 slightly differs from one slot to another, the difference in the total number of turns of the unit coils 51 and 52 from one slot 33 to another would be allowed if the difference is small such that the motor characteristics are not substantially influenced.

Before inserted into the stator 30, the first and second coil groups 411 and 412 have the same arrangement of the first and second unit coils 51 and 52. Slots into which the first coil group 411 is inserted differ from slots into which the second coil group 412 is inserted, so that an arrangement of the unit coils 51 and 52 of the first coil group 411 relative to the stator 30 also differs from an arrangement of the unit coils 51 and 52 of the second coil group 412. In the embodiment, each of the first and second groups 411 and 412 has six first unit coils 51 and twelve second unit coils 52.

The following will describe a concrete arrangement of the unit coils 51 and 52 of the first and second coil groups 411 and 412. FIG. 2 shows an arrangement of the unit coils 51 and 52 of the first and second coil groups 411 and 412, which arrangement is a concept obtained by linearly developing the first and second coil groups 411 and 412 as shown in FIG. 1. FIG. 2 shows thirty-six slots 3 in total. Reference symbol "N" is an integer ranging from 1 to 36 and represents slot number.

Ends of the first or second unit coils 51 or 52 are inserted into the slots 33. In FIG. 2, U-phase unit coils 51 and 52 are shown by solid line, V-phase unit coils 51 and 52 are shown by broken line and W-phase unit coils 51 and 52 are shown by alternate long and short dash line. Black circles denote U-phase unit coils 51 and 52. Black squares denote V-phase unit coils 51 and 52. Black triangles denote W-phase unit coils 51 and 52.

In the first coil group 411, six first unit coils 51 are inserted into outer circumferential sides of slot Nos. 1, 4, 7, 19, 22 and 25 and inner circumferential sides of slot Nos. 10, 13, 16, 28, 31 and 34. Twelve second unit coils 52 are inserted into outer circumferential sides of slot Nos. 2, 5, 8, 11, 14, 17, 20, 23, 26, 29, 32 and 35 and inner circumferential sides of slot Nos. 9, 12, 15, 18, 21, 24, 27, 30, 33, 36, 3 and 6. As a result, the unit coils 51 and 52 are arranged so that adjacent unit coils 51 and 52 overlap in turn, in such a manner that the inner circumferential side of the stator 30 corresponds to a clockwise direction and the outer circumferential side of the stator 30 corresponds to a counterclockwise direction.

Each coil pair 53 is composed of the first unit coil 51 and the second unit coil 52 inserted into the slot 33 located inside the first unit coil 51. More specifically, six coil pairs 53 are composed of six first unit coils 51 inserted into slot Nos. 1, 4, 7, 19, 22 and 25 and slot Nos. 10, 13, 16, 28, 31 and 34 and six second unit coils 52 inserted into slot Nos. 2, 5, 8, 20, 23 and 26 and slot Nos. 9, 12, 15, 27, 30 and 33, respectively.

Three-phase four-poles include first poles constituted by the coil pairs 53 and second poles constituted by the second unit coils 52, and the first and second poles are disposed alternately. More specifically, three-phase four-poles in the first coil group 411 include the first poles constituted by the coil pairs 53 including the first unit coils 51 and the second unit coils 52 arranged at the inner diameter side of the stator core 31 relative to the first unit coils 51 and the second poles each one of which is constituted by a single second unit coil 52. The first and second poles are arranged alternately.

The second coil group 412 has the same arrangement as the first coil group 411 before arranged in the stator 30. The second coil group 412 is arranged in the stator 30 while being shifted by an angle obtained by dividing 360° by the number of poles relative to the first coil group 411, in this case, 90° by the mechanical angle, namely, at a slot pitch of nine slots. More specifically, in the second coil group 412, six first unit coils 51 are inserted into the outer circumferential sides of slot Nos. 10, 13, 16, 28, 31 and 34 and the inner circumferential sides of slot Nos. 19, 22, 25, 1, 4 and 7, respectively. Twelve second unit coils 52 are inserted into the outer circumferential sides of slot Nos. 2, 5, 8, 11, 14, 17, 20, 23, 26, 29, 32 and 35 and the inner circumferential sides of slot Nos. 9, 12, 15, 18, 21, 24, 27, 30, 33, 36, 3 and 6, respectively.

In this case, six coil pairs 53 are composed of six first unit coils 51 inserted into slot Nos. 10, 13, 16, 28, 31 and 34 and slot Nos. 19, 22, 25, 1, 4 and 7 and six second unit coils 52 inserted into slot Nos. 11, 14, 17, 29, 32 and 35 and slot Nos. 18, 21, 24, 36, 3 and 6. The first and second coil groups 411 and 412 have the same arrangement of the second unit coils 52. More specifically, in the first and second coil groups 411 and 412, the slots into which both ends of the second unit coils 52 are inserted are formed at a slot pitch of nine slots, and the second unit coils 52 are arranged in the stator core 31 at a slot pitch of nine slots.

Regarding the second coil group 412, too, three-phase four-poles include first poles constituted by the coil pairs 53 and second poles constituted by the second unit coils 52, and the first and second poles are disposed alternately. More specifically, three-phase four-poles in the second coil group 412 include the first poles constituted by the coil pairs 53 including the first unit coils 51 and the second unit coils 52 arranged at the outer diameter side of the stator core 31 relative to the first unit coils 51 and the second poles each one of which is constituted by a single second unit coil 52. The first and second poles are arranged alternately.

When the first and second coil groups 411 and 412 have been arranged on the stator core 31, in the slots 33 are inserted ends of the first or second unit coils 51 or 52 forming the first coil group 411 and ends of the first or second unit coils 51 or 52 forming the second coil group 412. More specifically, the ends of the two unit coils 51 and 52 are inserted in the slots 33. The unit coils 51 and 52 have the same number of turns. Accordingly, the numbers of turns of the unit coils inserted in the respective slots 33, namely, the numbers of the copper wires inserted in the respective slots 33 are the same.

Manufacturing Method

Next, a method of manufacturing the electrical rotating machine having the above-described construction will now be described. Firstly, a unit coil manufacturing process is carried out. The first unit coils 51 and the second unit coils 52 are manufactured by a winding machine (not shown) in the unit coil manufacturing process. Subsequently, a coil group manufacturing process is carried out. Six first unit coils 51 and twelve second unit coils 52 are arranged by the lap winding method in the coil group manufacturing process, so that the first coil group 411 and the second coil group 412 are manufactured. At this time, there is no constructional difference between the first and second coil groups 411 and 412.

Subsequently, a coil insertion process is carried out. In the coil insertion process, the first coil group 411 and the second coil group 412 having the same construction in the state where both groups have not been inserted in the slots 33 are inserted into the slots 33 while being shifted from each other by a predetermined slot pitch. More specifically, the ends of the unit coils 51 and 52 of the first coil group 411 are firstly inserted into the slots 33 of the stator 30 in the coil insertion process. As a result, the first coil group 411 is arranged at the outer circumferential side of the stator 30. Next, the second coil group 412 is inserted into the slots 33 while being circumferentially shifted by the predetermined slot pitch relative to the first coil group 411, that is, by the pitch of nine slots. As a result, the second coil group 412 is arranged at the inner circumferential side of the stator 30, that is, at the inner circumferential side relative to the first coil group 411.

A coil end spreading process is subsequently carried out. In the coil end spreading process, coil ends of the first and second coil groups 411 and 412 are spread although the process is not shown in detail in the drawings. As a result, the stator 30 is completed. The stator 30 is then combined with the rotor 20 in a subsequent process, with the result that the rotating electrical machine 10 is completed.

The stator 30 is provided with an insulating paper 34 to ensure electrical insulation between the first coil group 411 and the second coil group 412 and interphase insulating papers (not shown) to ensure electrical insulation between the phases, as shown in FIG. 1. The insulating paper 34 is provided between the first and second coil groups 411 and 412. The insulating paper 34 is formed into an annular shape by cutting an insulating aramid paper into a strip shape and connecting both ends of the strip. The interphase insulating papers are provided between the phase unit coils 51 and 52 of the first coil group 411. The interphase insulating paper comprises a rectangular insulating aramid paper, for example. Since no coils belonging to different phases are in the slots 33 in the embodiment, the interphase insulating papers need not be provided in the slots 33.

In the embodiment described above, the coils of each phase are divided into the first coil group 411 and the second coil group 412, and each of which coil groups is inserted into the slots 33 of the stator 30. Accordingly, the number of copper wires inserted into the slots 33 at a time can be reduced with a result that the flexibility of the coils can be increased. This improves the operability at the time of insertion of the first and second coil groups 411 and 412 into the slots 33. Consequently, the coils can easily be inserted into the slots 33, and the productivity of the rotating electrical machine 10 can be improved.

Further, the unit coils 51 and 52 forming the first and second coil groups 411 and 412 have the same number of turns. Accordingly, a plurality of types of unit coils having different numbers of turns need not be manufactured in order that the coils may be inserted into the slots 33 at a plurality of divided steps. This can reduce the number of manufacturing processes of the unit coils with a result of further improvement in the productivity.

Further, the first and second coil groups have the same configuration before insertion into the slots 33. Accordingly, the processes to manufacture the first and second coil groups can be commonalized. This can reduce the number of processes to manufacture the first and second coil groups 411 and 412 and can accordingly reduce the number of processes to manufacture the stator 30.

Further, for example, when coils are simply divided into a plurality of groups in the case where two, large and small coils configure each one pole, as in the conventional art, a necessary total number of unit coils is obtained by (number of coils in each pole)×(number of poles)×(number of phases)×(number of divided groups). In this case, for example, when three-phase four-pole coils are divided into two stages, the necessary total number of unit coils is obtained by 2×4×3×2=48. On the other hand, in the embodiment, the necessary total number of unit coils is obtained by {(number of first unit coils (6))+(number of second unit coils (12))}×(number of coil groups (2))=36. Accordingly, the embodiment can reduce the necessary number of coils as compared with the conventional configuration. As a result, the number of processes to manufacture the unit coils 51 and 52 and the number of processes to arrange the unit coils 51 and 52 in the stator 30 can be reduced with a result that the productivity of the rotating electrical machine 10 can further be improved.

The unit coils 51 and 52 include parts protruding the slots 33 of the stator 30 respectively. These parts are referred to as "coil ends." Since the coil ends do not contribute to motor characteristics, it is desirable to reduce the coil ends as much as possible. However, in the conventional manufacturing method in which all the coils are inserted into the slots in the same process, the flexibility of coils is low and accordingly, the coils cannot be arranged to a high density. As a result, a reduction in size of the coil is difficult. On the other hand, the flexibility of the coil at each time of insertion can be improved in the embodiment by dividing the coils into the first coil group 411 and the second coil group 412 and then inserting the divided first and second coil groups 411 and 412. This can reduce the size of coil end. This can render the overall rotating electrical machine smaller in size and achieve higher efficiency as compared with the conventional rotating electrical machine with the same size. Further, since the coil ends are rendered smaller, the total length of copper wire formed into the coils can be reduced. Consequently, an amount of copper wire required for the coils can be reduced with a result of cost reduction.

The first and second coil groups 411 and 412 may be modified as follows. For example, the number of turns of the first unit coil 51 may be set to X1 and the number of turns of the second unit coil 52 may be set to X2 in the first coil group 411. On the other hand, the number of turns of the first unit coil 51 may be set to X2 and the number of turns of the second unit coil 52 may be set to X1 in the second coil group 412. As a result, a total number of windings inserted into each slot 33 can be uniformed into (X1+X2). Accordingly, the same effect as in the first embodiment can be achieved regarding the operability in the insertion of the first and second coil groups 411 and 412 into the slots 33 although the first coil group 411 and the second coil group 412 need to be manufactured independently.

Second Embodiment

Figure 3:
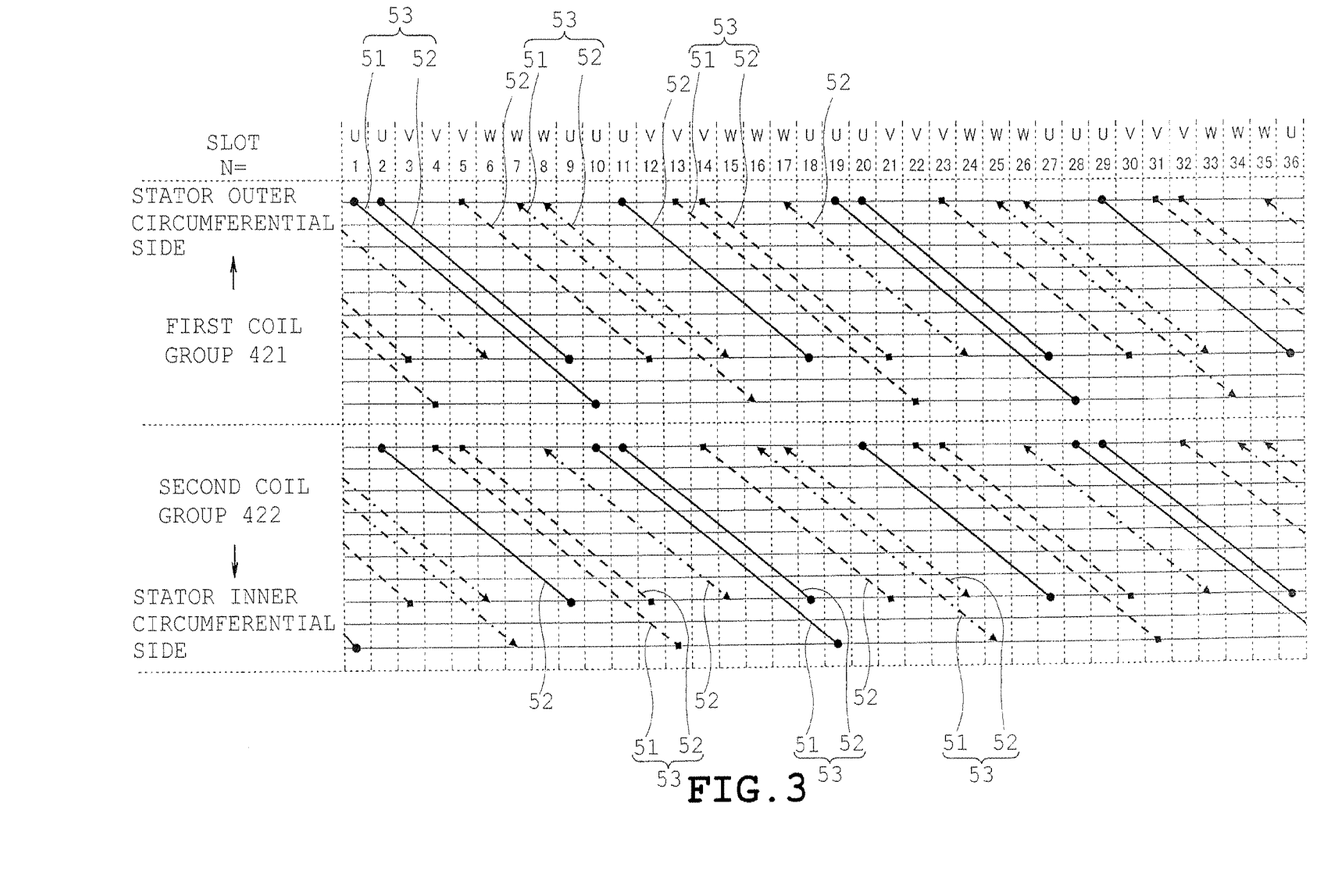
FIG. 3 is a view similar to FIG. 2, showing a second embodiment.

A second embodiment will be described with reference to FIG. 3. In the second embodiment, the stator 30 includes a first coil group 421 and a second coil group 422, instead of the first coil group 411 and the second coil group 412 in the first embodiment. The coil groups 421 and 422 differ in the arrangement of the unit coils 51 and 52 from the coil groups 411 and 412 respectively although having the same numbers of unit coils 51 and 52 as those in the first embodiment.

In this case, the V-phase unit coils 51 and 52 of the first coil group 421 in the second embodiment are shifted by an angle obtained by dividing 360° by the number of poles, in this case, by the mechanical angle of 90°, that is, the slot pitch of 9 slots, relative to the V-phase unit coils 51 and 52 of the first coil group 411. In the similar manner, the V-phase unit coils 51 and 52 of the second coil group 422 in the second embodiment are shifted by an angle obtained by dividing 360° by the number of poles, in this case, by the mechanical angle of 90°, that is, the slot pitch of 9 slots, relative to the V-phase unit coils 51 and 52 of the second coil group 412.

The coil groups 411 and 412 in the first embodiment include a first part in which three-phase coil pairs 53 are continuously arranged and a second part in which three-phase second unit coils 52 are continuously arranged, as shown in FIG. 1. These first and second parts appear alternately. The copper wire of the second part has a larger density than the copper wire of the first part. An amount of coil end which can contribute to downsizing thereof is smaller in the first part than in the second part. Accordingly, when the copper wire density becomes non-uniform in the circumferential direction of the stator 30 with the result that coarseness and denseness alternately appear, an irregular state appears in the size of coil ends, as shown in FIG. 1. This reduces an amount of coil end which can contribute to downsizing thereof, in an overall winding.

On the other hand, the coil pairs 53 and the second unit coils 52 are arranged alternately in the first and second coil groups 421 and 422 in the second embodiment. As a result, the copper wire density can be uniformed in the circumferential direction by averaging. This can achieve downsizing of the coil end in an overall winding.

The first and second coil groups 421 and 422 may also be modified in the following manner. More specifically, for example, the number of turns of the first unit coil 51 may be set to X1 and the number of turns of the second unit coil 52 may be set to X2 in the first coil group 421. On the other hand, the number of turns of the first unit coil 51 may be set to X2 and the number of turns of the second unit coil 52 may be set to X1 in the second coil group 422. As a result, a total number of windings inserted into each slot 33 can be uniformed into (X1+X2). Accordingly, the same effect as in the first embodiment can be achieved regarding the operability in the insertion of the first and second coil groups 421 and 422 into the slots 33 although the first coil group 421 and the second coil group 422 need to be manufactured independently.

Third Embodiment

Figure 4:
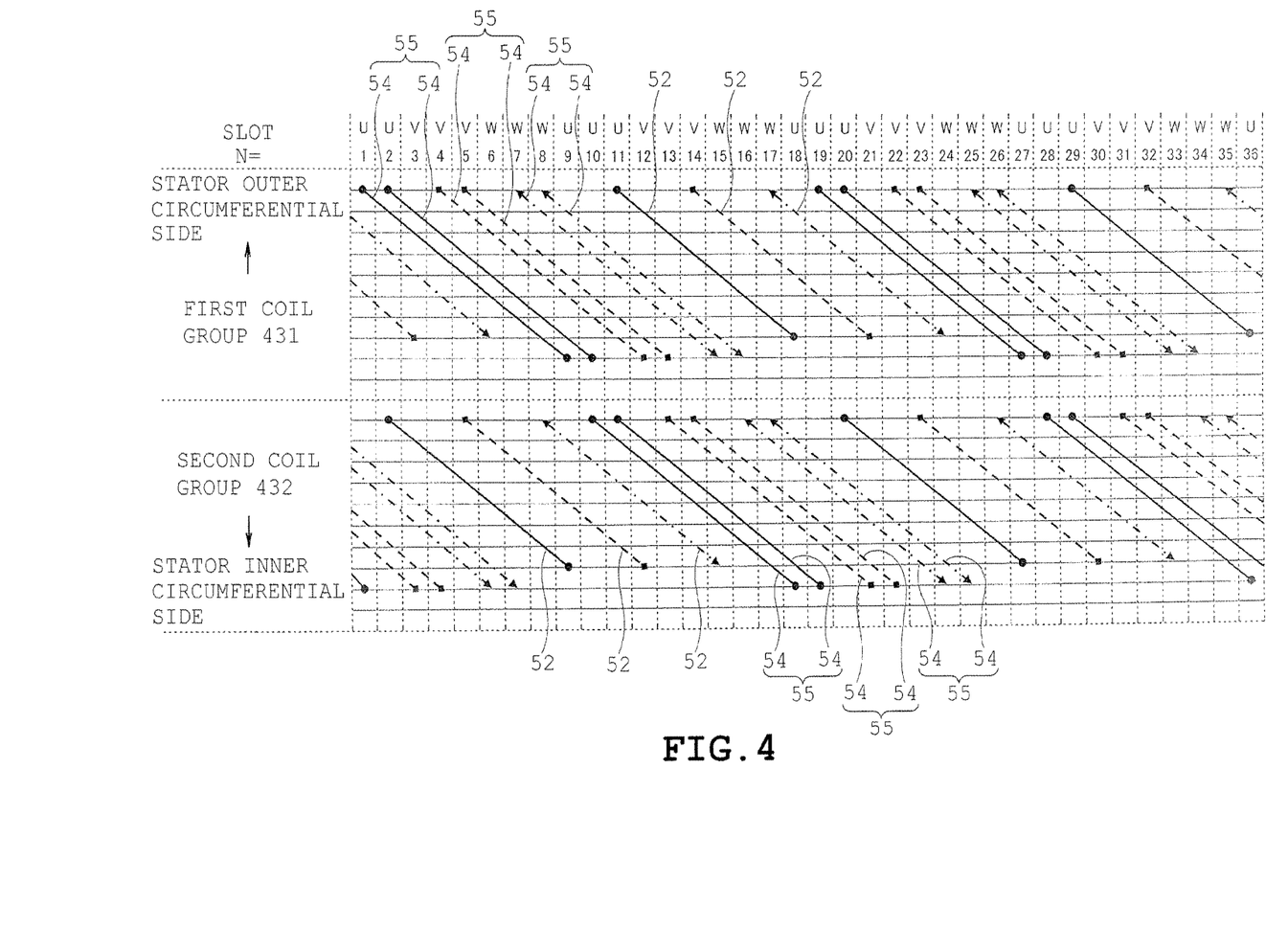
FIG. 4 is a view similar to FIG. 2, showing a third embodiment.

A third embodiment will be described with reference to FIG. 4. In the third embodiment, the configurations of the first and second coil groups 431 and 432 differ from those of the first and second coil groups 411 and 412 in the first embodiment. More specifically, each of the first coil group 431 and the second coil group 432 includes twelve first unit coils 54 and six second unit coils 52. Each first unit coil 54 has a smaller outer diameter than each second unit coil 51. More specifically, a total length of the first unit cols 54 in the third embodiment is shorter than the total length of the first unit coils 51 in the first embodiment. The first and second unit coils 54 and 52 have the same number of turns of copper wire but differ from each other in the outer diameter of the coil and the slot pitch. A pitch of the first unit coils 54 is eight slots.

The first coil group 431 includes twelve first unit coils 54 which are inserted into the outer peripheral sides of slot Nos. 1, 2, 4, 5, 7, 8, 19, 20, 22, 23, 25 and 26 and the inner peripheral sides of the slot Nos. 9, 10, 12, 13, 15, 16, 27, 28, 30, 31, 33 and 34 respectively. Further, six second unit coils 52 are inserted into the outer peripheral sides of the slot Nos. 11, 14, 17, 29, 32 and 35 and the inner peripheral sides of the slot Nos. 18, 21, 24, 36, 3 and 6 respectively.

In this case, six coil pairs 55 are constituted by two adjacent first unit coils 54 belonging to the same phase.

Three-phase four-poles include first poles constituted by the coil pairs 55 and second poles constituted by the second unit coils 52, and the first and second poles are disposed alternately. This configuration achieves the same operation or work and advantageous effect as in the first embodiment.

Further, in the first and second embodiments, the coil pairs 53 are configured by coils arranged at different slot pitches, in this case, a pitch of the first unit coils 51 is nine slots and a pitch of the second unit coils 52 is seven slots. Accordingly, the first and second unit coils 52 arranged at the outer circumferential side of the stator core 31 in the coil pairs 53 are arranged so as to cover the other coils arranged at the inner peripheral side of the stator core 31. Accordingly, the first or second unit coils 51 or 52 arranged at the outer circumferential side of the stator core 31 tend to be longer as a whole.

On the other hand, in the third embodiment, each coil pair 55 is configured by coils arranged at the same coil pitch, in this case, two unit coils 54 a pitch of each of which is eight slots. Since all the unit coils 54 are arranged at the same slot pitch in this case, parts of the unit coils 54 overlap each other. Accordingly, an increase in the lengths of the unit coils 54 can be reduced as a whole. This can render the total length of the copper wire of the coil pairs 55 as a whole shorter as compared with the first and second embodiments, resulting in cost reduction. The third embodiment can achieve further downsizing of the coil ends by rendering the total length of copper wire of the coil pairs 55 as a whole, as compared with the first and second embodiments.

Fourth Embodiment

Figure 5:
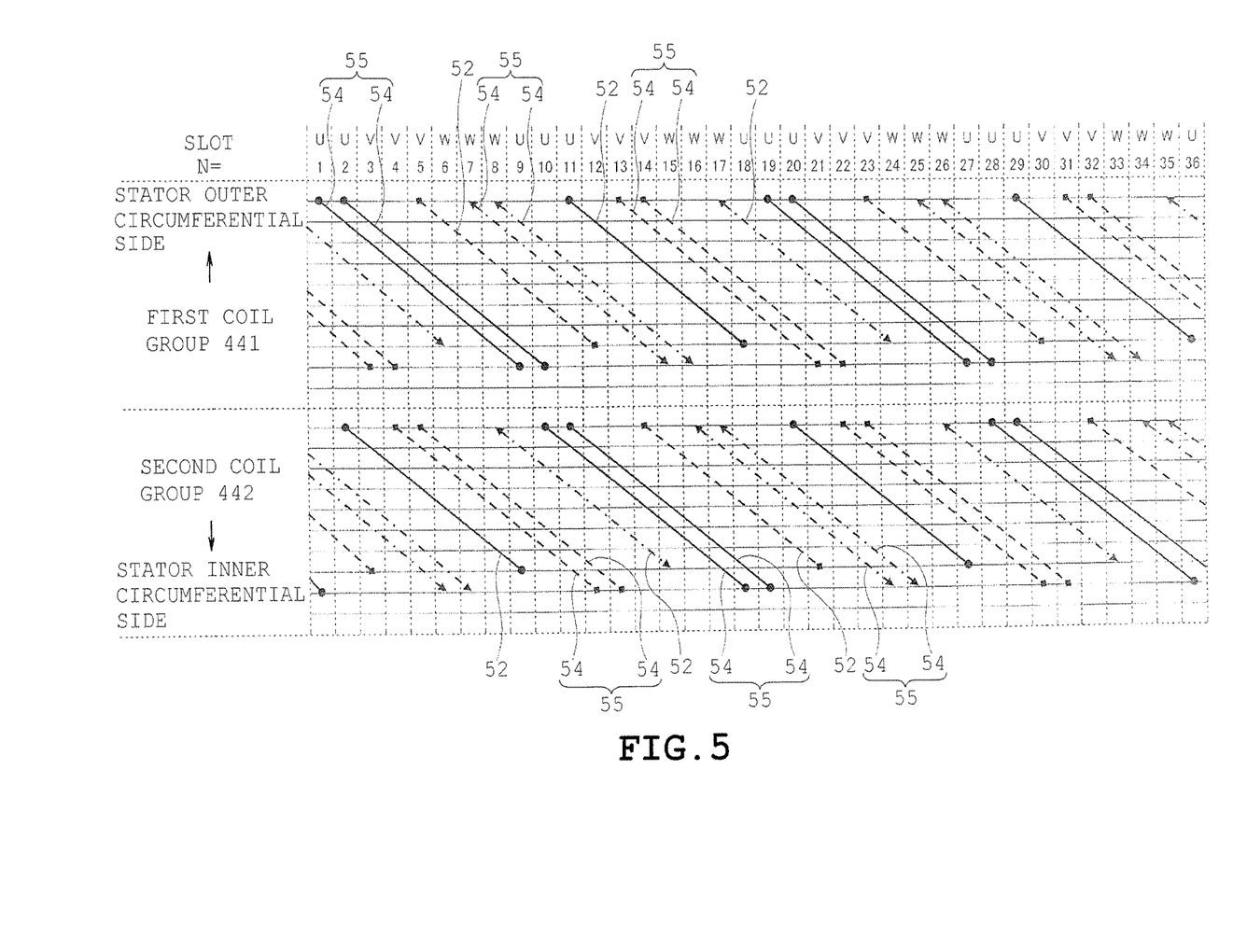
FIG. 5 is a view similar to FIG. 2, showing a fourth embodiment.

A fourth embodiment will be described with reference to FIG. 5. In the fourth embodiment, the technical idea similar to that of the second embodiment is applied to the configuration of the third embodiment. More specifically, in the fourth embodiment, the stator 30 includes a first coil group 441 and a second coil group 442, instead of the first coil group 431 and the second coil group 432 in the third embodiment. In the first coil group 441, V-phase unit coils 54 and 52 are shifted by an angle obtained by dividing 360° by the number of poles, in this case, 90° in mechanical angle, namely, a pitch of nine slots with respect to the first coil group 431 in the third embodiment. This configuration achieves the same work and advantageous effect as in the second embodiment in addition to the same work and advantageous effect as in the third embodiment.

In the fourth embodiment, the stator includes a plurality of types of unit coils having the same number of turns and inserted into the slots at different pitches for every type and a plurality of coil groups configured by inserting a plurality of unit coils into the slots by a manner of lap winding and arranged in a radially lapped state with respect to the stator. The coil groups are shifted by a predetermined slot pitch so that total numbers of turns of the unit coils inserted into the respective slots equal one another.

The above-described configuration achieves the same work and advantageous effect as those in the first to third embodiments. Further, since the coils can be inserted into the slots of the stator for every one of coil groups, an amount of coil inserted at one time can be reduced. This can increase the flexibility of the coils and improve the operability in the insertion of the coils into the slots, with the result that the productivity of the rotating electrical machines can be improved. Further, the coil groups have the same configuration before insertion into the slots. Accordingly, the coil groups need not have different configurations from one to another. This can reduce the number of processes to manufacture the coils groups as much as possible, with the result the productivity of the rotating electrical machine can be improved.

Further, since each coil pair 55 is configured by two unit coils 54 arranged at the pitch of 8 slots as in the third embodiment, the total length of copper wire of the overall coil pairs 55 can be rendered as short as possible. Further, the first and second coil groups 441 and 442 are configured by the coil pairs 55 and the second unit cols 52 both of which are arranged alternately. Accordingly, the density of copper wire can be uniformed in the circumferential direction of the stator core 31 by averaging. This can achieve further downsizing of the coil end in an overall winding as compared with the third embodiment.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A rotating electrical machine comprising:
a stator including a plurality of slots into which coils are insertable, a plurality of types of unit coils configured to be inserted into the slots at slot pitches differing for every type of unit coil, and a plurality of coil groups formed by arranging the unit coils in a lap winding so that the unit coils are overlapped in a radial direction of the stator; and
a rotor rotatably provided on the stator,
wherein the coil groups have an identical arrangement configuration before insertion into the slots and the coil groups arranged in a radial direction of the stator are configured to be inserted into the slots so as to be shifted from each other by a predetermined slot pitch in a circumferential direction of the stator.

2. The rotating electrical machine according to claim 1, wherein the coil groups are equal in a total number of turns of the unit coils inserted into the respective slots.

3. The rotating electrical machine according to claim 1, wherein the unit coils include a first unit coil and a second unit coil, and phase poles in each coil group include a first pole constituted by a pair of the first and second unit coils and a second pole constituted by a single second unit coil, the first and second poles being arranged alternately.

4. The rotating electrical machine according to claim 1, wherein the unit coils include a first unit coil and a second unit coil, and phase poles in each coil group include a first pole constituted by a pair of first unit coils shifted from each other by a predetermined pitch and a second pole constituted by a single second unit coil, the first and second poles being arranged alternately.

5. The rotating electrical machine according to claim 1, wherein the unit coils have an identical number of turns.

6. The rotating electrical machine according to claim 2, wherein the unit coils include a first unit coil and a second unit coil, and phase poles in each coil group include a first pole constituted by a pair of the first and second unit coils and a second pole constituted by a single second unit coil, the first and second poles being arranged alternately.

7. The rotating electrical machine according to claim 2, wherein the unit coils include a first unit coil and a second unit coil, and phase poles in each coil group include a first pole constituted by a pair of first unit coils shifted from each other by a predetermined pitch and a second pole constituted by a single second unit coil, the first and second poles being arranged alternately.

8. The rotating electrical machine according to claim 2, wherein the unit coils have an identical number of turns.

9. The rotating electrical machine according to claim 3, wherein each coil group includes the paired coils and the second unit coil both of which are arranged alternately.

10. The rotating electrical machine according to claim 3, wherein the unit coils have an identical number of turns.

11. The rotating electrical machine according to claim 4, wherein each coil group includes the paired coils and the second unit coil both of which are arranged alternately.

12. The rotating electrical machine according to claim 4, wherein the unit coils have an identical number of turns.

13. The rotating electrical machine according to claim 6, wherein each coil group includes the paired coils and the second unit coil both of which are arranged alternately.

14. The rotating electrical machine according to claim 6, wherein the unit coils have an identical number of turns.

15. The rotating electrical machine according to claim 7, wherein each coil group includes the paired coils and the second unit coil both of which are arranged alternately.

16. The rotating electrical machine according to claim 7, wherein the unit coils have an identical number of turns.

17. The rotating electrical machine according to claim 9, wherein the unit coils have an identical number of turns.

18. The rotating electrical machine according to claim 11, wherein the unit coils have an identical number of turns.

19. The rotating electrical machine according to claim 13, wherein the unit coils have an identical number of turns.

20. A method of manufacturing a rotating electrical machine, comprising:
    making a plurality of types of unit coils configured to be inserted into slots of a stator at slot pitches differing for every type of the unit coil;
    making a plurality of coil groups out of the unit coils by a lap winding method, the coil groups being insertable into the slots; and
    inserting the coil groups into the slots while being shifted from each other at a predetermined slot pitch in a circumferential direction of the stator, after having been overlapped in a radial direction of the stator.

* * * * *